(12) United States Patent
Sai

(10) Patent No.: US 8,224,594 B2
(45) Date of Patent: Jul. 17, 2012

(54) APPARATUS AND METHOD FOR DYNAMIC PEAK DETECTION, IDENTIFICATION, AND TRACKING IN LEVEL GAUGING APPLICATIONS

(75) Inventor: Bin Sai, The Hague (NL)

(73) Assignee: Enraf B.V., Delft (NL)

(*) Notice: Subject to any disclaimer, the term of this patent is extended or adjusted under 35 U.S.C. 154(b) by 338 days.

(21) Appl. No.: 12/534,679

(22) Filed: Aug. 3, 2009

(65) Prior Publication Data
US 2010/0070208 A1    Mar. 18, 2010

Related U.S. Application Data

(60) Provisional application No. 61/098,155, filed on Sep. 18, 2008.

(51) Int. Cl.
*G06F 17/00* (2006.01)
*H04B 15/00* (2006.01)

(52) U.S. Cl. ............... 702/55; 702/56; 702/57; 702/189

(58) Field of Classification Search .............. 702/55–78, 702/103, 104, 182–190
See application file for complete search history.

(56) References Cited

U.S. PATENT DOCUMENTS

| | | | |
|---|---|---|---|
| 3,217,267 A | 11/1965 | Loposer | |
| 3,337,814 A | 8/1967 | Brase et al. | |
| 3,353,104 A | 11/1967 | Loposer | |
| 3,579,281 A | 5/1971 | Kam et al. | |
| 3,789,302 A | 1/1974 | Rearwin et al. | |
| 3,903,482 A | 9/1975 | Pausini et al. | |
| 4,000,476 A | 12/1976 | Walker et al. | |
| 4,024,464 A | 5/1977 | Underhill et al. | |
| 4,027,274 A | 5/1977 | Fukui et al. | |
| 4,068,199 A | 1/1978 | Madoff | |
| 4,072,947 A | 2/1978 | Johnson | |
| 4,114,110 A | 9/1978 | Nossen | |
| 4,361,801 A | 11/1982 | Meyer et al. | |
| 4,451,930 A | 5/1984 | Chapman et al. | |
| 4,510,461 A | 4/1985 | Dickes et al. | |
| 4,516,084 A | 5/1985 | Crowley | |

(Continued)

FOREIGN PATENT DOCUMENTS

DE    296 08 551 U1    7/1996

(Continued)

OTHER PUBLICATIONS

"HERMetic Sensor", Honeywell Enraf, (no month) 2007, 5 pages.

(Continued)

*Primary Examiner* — Phuong Huynh

(57) ABSTRACT

A method includes receiving data identifying wireless signals including wireless signals reflected off a surface of material in a tank and detecting a plurality of reflection peaks associated with the wireless signals. The method also includes classifying at least some of the detected reflection peaks and tracking at least some of the classified reflection peaks. The method further includes identifying a level of the material using at least one of the tracked reflection peaks. The classified peaks could include main-mode and/or high-mode reflection peaks, where the material level is identified using the main-mode peak or using an estimated location of the main-mode peak based on the high-mode peak. The classified peaks could also include level, bottom, and obstruction peaks, where the material level is identified by using a known permittivity, the bottom peak, and a tank height to estimate a location of the level peak when the level peak is lost or obscured.

20 Claims, 6 Drawing Sheets

U.S. PATENT DOCUMENTS

| | | |
|---|---|---|
| 4,567,448 A | 1/1986 | Ikeda |
| 4,675,617 A | 6/1987 | Martin |
| 4,691,176 A | 9/1987 | Hsiung et al. |
| 4,800,341 A | 1/1989 | Johnson |
| 4,823,399 A | 4/1989 | George |
| 4,868,494 A | 9/1989 | Ryder et al. |
| 4,928,525 A | 5/1990 | Aderholt et al. |
| 4,958,228 A | 9/1990 | Kutsuki |
| 4,972,160 A | 11/1990 | Sylvain |
| 5,027,526 A | 7/1991 | Crane |
| 5,034,703 A | 7/1991 | Schumacher |
| 5,036,291 A | 7/1991 | Marz |
| 5,052,028 A | 9/1991 | Zwack |
| 5,210,539 A | 5/1993 | Voyce |
| 5,270,669 A | 12/1993 | Jokura |
| 5,400,253 A | 3/1995 | O'Connor |
| 5,406,842 A | 4/1995 | Locke |
| 5,428,361 A | 6/1995 | Hightower et al. |
| 5,442,359 A | 8/1995 | Rubin |
| 5,446,416 A | 8/1995 | Lin et al. |
| 5,572,167 A | 11/1996 | Alder et al. |
| 5,708,424 A | 1/1998 | Orlando et al. |
| 5,734,302 A | 3/1998 | Teng et al. |
| 5,773,913 A | 6/1998 | Casselden |
| 5,774,089 A | 6/1998 | Bamler et al. |
| 5,923,284 A | 7/1999 | Artis et al. |
| 5,994,905 A | 11/1999 | Franchville |
| 6,107,957 A | 8/2000 | Cramer et al. |
| 6,114,987 A | 9/2000 | Bjornholt |
| 6,374,187 B1 | 4/2002 | Knight et al. |
| 6,404,288 B1 | 6/2002 | Achim et al. |
| 6,621,449 B1 | 9/2003 | Kunert |
| 6,629,458 B1 | 10/2003 | Westerling et al. |
| 6,636,575 B1 | 10/2003 | Ott |
| 6,662,649 B1 | 12/2003 | Knight et al. |
| 6,671,500 B2 | 12/2003 | Damgaard et al. |
| 6,762,634 B1 | 7/2004 | Hattori |
| 6,774,732 B1 | 8/2004 | Harnishfeger et al. |
| 6,876,261 B2 | 4/2005 | Gumm |
| 7,135,870 B2 | 11/2006 | Mohajer et al. |
| 7,891,229 B2 | 2/2011 | Sai |
| 2002/0101373 A1 | 8/2002 | Arndt et al. |
| 2002/0183030 A1 | 12/2002 | Damgaard et al. |
| 2003/0167839 A1 | 9/2003 | Burger et al. |
| 2004/0196177 A1 | 10/2004 | Billington et al. |
| 2004/0207477 A1 | 10/2004 | Gumm |
| 2005/0052314 A1 | 3/2005 | Spanke et al. |
| 2005/0190098 A1 | 9/2005 | Bridgelall et al. |
| 2005/0206555 A1 | 9/2005 | Bridgelall et al. |
| 2006/0044145 A1 | 3/2006 | Akerstrom et al. |
| 2006/0044147 A1 | 3/2006 | Knox et al. |
| 2006/0143000 A1 | 6/2006 | Setoguchi |
| 2007/0046528 A1* | 3/2007 | Larsson et al. ............... 342/124 |
| 2007/0109177 A1 | 5/2007 | Baath et al. |
| 2010/0002912 A1 | 1/2010 | Solinsky |
| 2010/0037673 A1 | 2/2010 | Wicht et al. |
| 2010/0066589 A1 | 3/2010 | Sai et al. |
| 2010/0070207 A1 | 3/2010 | Sai |
| 2010/0070209 A1 | 3/2010 | Sai |
| 2010/0175470 A1 | 7/2010 | Schrier et al. |
| 2010/0241369 A1 | 9/2010 | Wicht et al. |
| 2011/0163910 A1 | 7/2011 | Sai |

FOREIGN PATENT DOCUMENTS

| | | |
|---|---|---|
| DE | 100 40 180 A1 | 4/2002 |
| DE | 10 2004 061449 A1 | 6/2006 |
| DE | 10 2005 019 095 A1 | 10/2006 |
| EP | 0 573 034 A | 12/1993 |
| EP | 0 887 658 A | 12/1998 |
| GB | 2 064 188 A | 6/1981 |
| GB | 2 342 995 A | 4/2000 |
| NL | 1032192 | 7/2006 |
| WO | WO 98/12514 A1 | 3/1998 |
| WO | WO 2004/018978 A1 | 3/2004 |
| WO | WO 2004/053521 A1 | 6/2004 |
| WO | WO 2007/053007 A1 | 5/2007 |
| WO | WO 2007/111498 A2 | 10/2007 |
| WO | WO 2008/010702 A1 | 1/2008 |
| WO | WO 2008/104967 A2 | 9/2008 |
| WO | WO 2010/019427 A2 | 2/2010 |

OTHER PUBLICATIONS

"Servo Gauge 854ATG" Product Sheet, Enraf B.V., May 2008, 4 pages.

"Starrett Digitape 25", 1999 and possibly earlier, 4 pages.

European Search Report dated Aug. 17, 2010 in connection with European Patent Application No. EP 10 15 5559.

International Standard, Petroleum and liquid petroleum products-Measurement of level and temperature in storage tanks by automatic methods, Part 3: Measurement of level in pressurized storage tanks (non-refrigerated), 1st Edition, Nov. 15, 2002, 21 pages.

"Level sensor", wikipedia.org, Aug. 2, 2008, 8 pages.

Communication pursuant to Article 94(3) EPC dated Jan. 11, 2010 in connection with European Patent Application No. EP 09169534.

European Search Report dated Dec. 14, 2009 in connection with European Patent Application No. EP 09169534.

Notification of Transmittal of the International Search Report and the Written Opinion of the International Searching Authority, or the Declaration dated Oct. 28, 2008 in connection with PCT Patent Application No. PCT/NL2008/000196.

Bai Sin, et al., "Advanced High Precision Radar Gauge for Industrial Applications", Proceedings of the 2006 CIE International Conference on Radar, vol. 1, Oct. 16, 2006, pp. 463-466.

\* cited by examiner

APPARATUS AND METHOD FOR DYNAMIC PEAK DETECTION, IDENTIFICATION, AND TRACKING IN LEVEL GAUGING APPLICATIONS

CROSS-REFERENCE TO RELATED APPLICATIONS

This application claims priority under 35 U.S.C. §119(e) to U.S. Provisional Application No. 61/098,155 filed on Sep. 18, 2008, which is hereby incorporated by reference.

TECHNICAL FIELD

This disclosure relates generally to inventory management systems. More specifically, this disclosure relates to an apparatus and method for dynamic peak detection, identification, and tracking in level gauging applications.

BACKGROUND

Processing facilities and other facilities routinely include tanks for storing liquid materials and other materials. For example, storage tanks are routinely used in tank farm facilities and other storage facilities to store oil or other materials. As another example, oil tankers and other transport vessels routinely include numerous tanks storing oil or other materials.

Often times, it is necessary or desirable to measure the amount of material stored in a tank. This may be useful, for example, during loading of material into the tank or unloading of material from the tank. As particular examples, "custody transfers" and "weights and measures of oil" often require highly accurate measurements from level gauging instruments installed on the roof of a tank. In bulk storage tanks, an error of one millimeter in a level reading can correspond to several cubic meters of volumetric error. This can result in losses of thousands of dollars for one or more parties.

One approach to measuring the amount of material in a tank involves the use of radar measurements. In this approach, electromagnetic signals are transmitted towards and reflected off the surface of material in a tank. In radar measurements, one common signal processing task is to detect and identify the reflection of the electromagnetic signals from a desired target, which in this case represents the surface of the material in the tank. In practice, however, the surface of the material is not the only thing that can reflect electromagnetic signals within a tank. Other objects inside a tank (such as the tank's bottom, agitators, heating coils, and ladders) may cause reflections as well. As a result, the task of target detection quickly becomes the task of identifying and tracking the target's reflection among various other reflections and interferences.

If the target's reflection can be separated from other reflections, it is relatively straightforward to detect and track the target. Unfortunately, this often does not occur in real-life situations, such as when the material's surface is close to an antenna, the tank roof, or the tank bottom or when obstructions are present. In these situations, mutual interactions or interferences between reflections can occur. As a consequence, the position and amplitude of the target's refection can be distorted considerably by destructive and constructive interferences.

In conventional systems, a target's refection can often be lost, and wrong level information can be provided to tank operators. This can lead to various problems, such as the overfilling of a tank. In the case of automated tank loading, the likelihood of tank overfilling increases even more. One approach to avoiding these problems is to use fuzzy logic scoring systems to track a limited number of reflection peaks (such as five to ten peaks). Another approach is to use empty tank spectra, or spectra captured when a tank is empty, to map reflections. However, these approaches often require pre-settings in software and historical data saved in memory. These approaches also often increase the complexity of commissioning a gauging system. In addition, empty tank spectra cannot be updated without emptying a tank, which results in lost revenue.

SUMMARY

This disclosure provides an apparatus and method for dynamic peak detection, identification, and tracking in level gauging applications.

In a first embodiment, a method includes receiving data identifying wireless signals including wireless signals reflected off a surface of material in a tank. The method also includes detecting a plurality of reflection peaks associated with the wireless signals. The method further includes classifying at least some of the detected reflection peaks and tracking at least some of the classified reflection peaks. In addition, the method includes identifying a level of the material in the tank using at least one of the tracked reflection peaks.

In a second embodiment, an apparatus includes a data acquisition unit configured to generate data associated with received wireless signals including wireless signals reflected off a surface of material in a tank. The apparatus also includes at least one processing device configured to detect a plurality of reflection peaks associated with the wireless signals and classify at least some of the detected reflection peaks. The at least one processing device is also configured to track at least some of the classified reflection peaks and identify a level of the material in the tank using at least one of the tracked reflection peaks.

In a third embodiment, a computer readable medium embodies a computer program. The computer program includes computer readable program code for receiving data identifying wireless signals including wireless signals reflected off a surface of material in a tank. The computer program also includes computer readable program code for detecting a plurality of reflection peaks associated with the wireless signals and computer readable program code for classifying at least some of the detected reflection peaks. The computer program further includes computer readable program code for tracking at least some of the classified reflection peaks and computer readable program code for identifying a level of the material in the tank using at least one of the tracked reflection peaks.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 8B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1A:
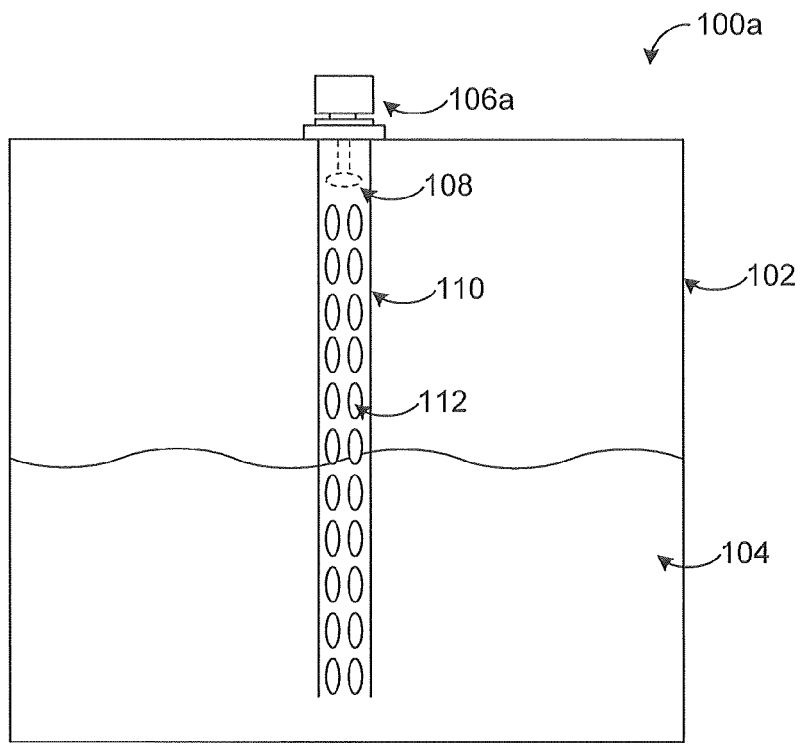
FIGS. 1A and 1B illustrate example tank level measurement systems according to this disclosure.
Figure 1B:
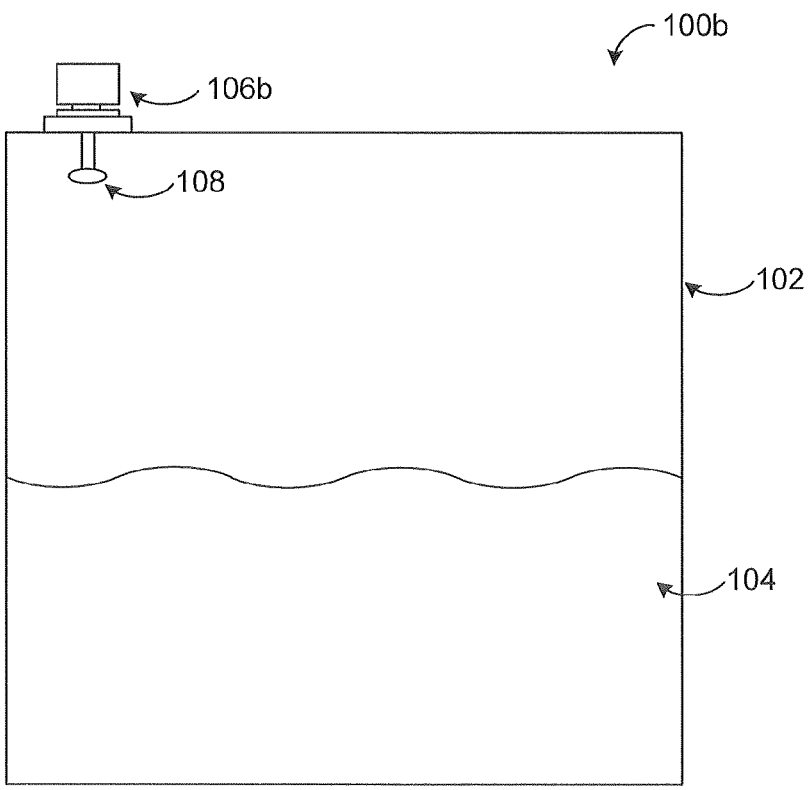

FIGS. 1A and 1B illustrate example tank level measurement systems 100a-100b according to this disclosure. In these examples, each system 100a-100b includes a tank 102 that can store one or more materials 104. The tank 102 generally represents any suitable structure for receiving and storing at least one liquid or other material. The tank 102 could, for example, represent an oil storage tank or a tank for storing other liquid(s) or other material(s). The tank 102 could also have any suitable shape and size. Further, the tank 102 could form part of a larger structure. The larger structure could represent any fixed or movable structure containing or associated with one or more tanks 102, such as a movable tanker vessel, railcar, or truck or a fixed tank farm.

Each system 100a-100b also includes a sensor 106a-106b, respectively. Each sensor 106a-106b is used to measure the level of material 104 in its corresponding tank 102. For example, an antenna 108 emits electromagnetic waves or other wireless signals towards the material 104 and receives reflected signals from the material 104. The sensor 106a-106b can then analyze the signals to determine the level of material 104 in the tank 102. Each sensor 106a-106b includes any suitable structure for generating signals for wireless transmission and for receiving reflected signals. The antenna 108 includes any suitable structure for transmitting and/or receiving wireless signals, such as a planar or horn antenna.

The sensor 106a in FIG. 1A is designed for stillpipe applications (also referred to as stillingwell or standpipe applications). Stillpipe applications involve the transmission of electromagnetic or other wireless signals through a stillpipe 110 within a tank 102. For convenience, the term "stillpipe" here refers collectively to stillpipes, stillingwells, or standpipes. The stillpipe 110 could, for example, be attached or coupled to a top surface of the tank 102. The stillpipe 110 includes various holes, slots, or other openings 112 so that the level of material 104 in the stillpipe 110 is generally equal to the level of the material 104 outside the stillpipe 110 in the tank 102. The stillpipe 110 includes any suitable structure for receiving material and allowing electromagnetic waves or other wireless signals to travel to and from the material. The stillpipe 110 can also be located at any suitable position, such as any position appropriate for the sake of convenience of operation.

The sensor 106b in FIG. 1B is designed for free-space applications. Free-space applications generally do not use structures to limit or guide wireless signals. Rather, level gauges used in free-space applications typically transmit electromagnetic or other wireless signals freely into the surrounding space within a tank 102.

In either case, the sensors 106a-106b can implement a highly-reliable signal processing algorithm to perform tracking on multiple parameters (the algorithm can be implemented in hardware, software, firmware, or combination thereof). In this disclosure, the sensors 106a-106b use the Hierarchical Decision Making (HDM) algorithm described below. The HDM algorithm can perform peak detection, identification, and tracking based on multiple parameters to identify information of interest. The HDM algorithm creates open structures to handle different reflection scenarios through classification, identification, and tracking. This technique can robustly handle target detection and identification under adverse conditions, where drastic interferences (such as from a tank bottom or from obstacles) can affect target identification. Moreover, material sensing may not be lost during operations using this technique, and no pre-settings or empty tank spectra may be required. The algorithm has a robust design and provides reliable performance in a wide variety of situations.

Among of things, this technique may require less effort for device installation, setting, and tuning. There may also be no need for setting zones and thresholds in reflection diagrams, and this technique can provide self-adaptive detection and tracking for dynamic or volatile situations in practical field scenarios. Further, the open structures may allow new classification scenarios to be added without affecting existing ones. In addition, this approach can satisfy various safety concerns, accuracy issues, and operation reliability.

Although FIGS. 1A and 1B illustrate example tank level measurement systems 100a-100b, various changes may be made to FIGS. 1A and 1B. For example, a system could include any number of tanks 102, sensors 106a or 106b, antennas 108, stillpipes 110, and other components. Also, the functional divisions shown in FIGS. 1A and 1B are for illustration only. Various components in FIGS. 1A and 1B could be omitted, combined, or further subdivided and additional components could be added according to particular needs. As a particular example, the signal processing functionality performed by a sensor 106a-106b could be performed by a processing system outside of and coupled to the sensor.

Figure 2:
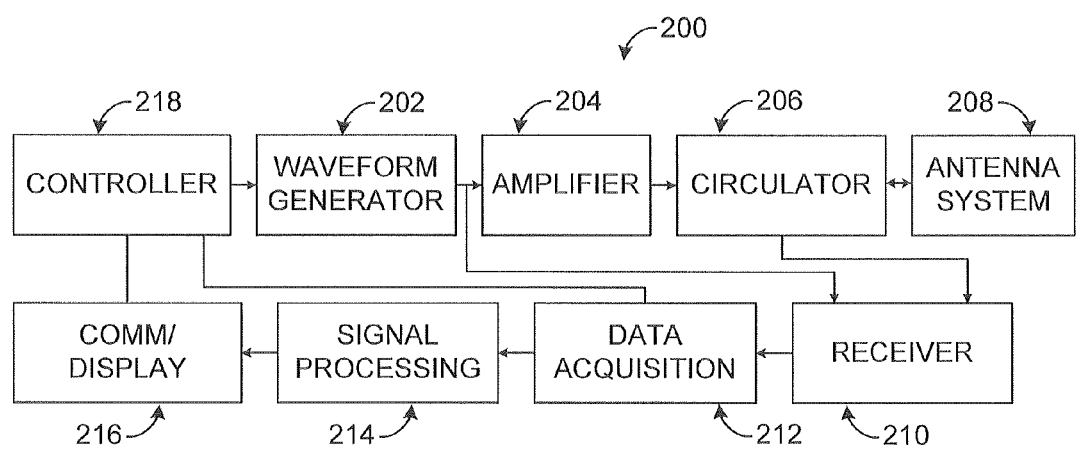
FIG. 2 illustrates an example level gauging system according to this disclosure.

FIG. 2 illustrates an example level gauging system 200 according to this disclosure. The level gauging system 200 shown in FIG. 2 could, for example, be used in the sensors 106a-106b of FIGS. 1A and 1B.

The level gauging system 200 shown in FIG. 2 can transmit a sequence of signals towards an object of interest, such as material 104 in a tank 102. This is done by generating signals using a waveform generator 202, amplifying the signals with an amplifier 204, and providing the amplified signals via a circulator 206 or similar device to an antenna system 208 for transmission.

The waveform generator 202 includes any suitable structure for generating signals to be transmitted wirelessly. The amplifier 204 includes any suitable structure for amplifying signals to be transmitted wirelessly. The circulator 206 includes any suitable structure allowing multiple components to access an antenna system. The antenna system 208 includes any suitable structure for transmitting or receiving wireless signals.

Wireless signals received by the antenna system 208 can be converted into lower frequency signals by the level gauging system 200. This is done by providing received wireless signals from the antenna system 208 to a receiver 210 via the circulator 206 or similar device. The receiver 210 down-converts the received signals to produce lower frequency signals. The lower frequency signals can be digitized or otherwise acquired in a data acquisition unit 212. The acquired data is then fed to a signal processing unit 214 for processing. The signal processing unit 214 may, for example, detect and identify reflection peaks and determine a position of the peak associated with a specific target (such as the reflection from the surface of material 104 in a tank 102). Information (such as the determined material level) can be displayed or transmitted via a communication or display unit 216, and a controller 218 can control the overall operation of the system 200. The controller 218 could, for example, control when level measurements are taken and control the acquisition of data from received wireless signals. The controller 218 could also control the display or communication of information by the communication or display unit 216.

The receiver 210 includes any suitable structure for processing received wireless signals. The data acquisition unit 212 includes any suitable structure for acquiring data, such as an analog-to-digital converter (ADC). The signal processing unit 214 includes any suitable structure for analyzing data associated with received wireless signals, such as a digital signal processor (DSP). The communication or display unit 216 includes any suitable structure for communicating or presenting data, such as a radio frequency (RF) or other wireless transceiver, an Ethernet or other wired interface, or a liquid crystal display (LCD), a light emitting diode (LED) display, or other display. The controller 218 includes any suitable structure for controlling operation of a level gauging system, such as a processor, microprocessor, microcontroller, field programmable gate array, application specific integrated circuit, or other computing or control device.

As noted above, the level gauging system 200 could implement an algorithm for dynamic peak detection, identification, and tracking. This functionality could be implemented using the signal processing unit 214, the controller 218, or other component(s) of the level gauging system 200. Details of an example dynamic peak detection, identification, and tracking algorithm are provided below.

Although FIG. 2 illustrates an example level gauging system 200, various changes may be made to FIG. 2. For example, the functional division shown in FIG. 2 is for illustration only. Various components in FIG. 2 could be omitted, combined, or further subdivided and additional components could be added according to particular needs.

Figure 3:
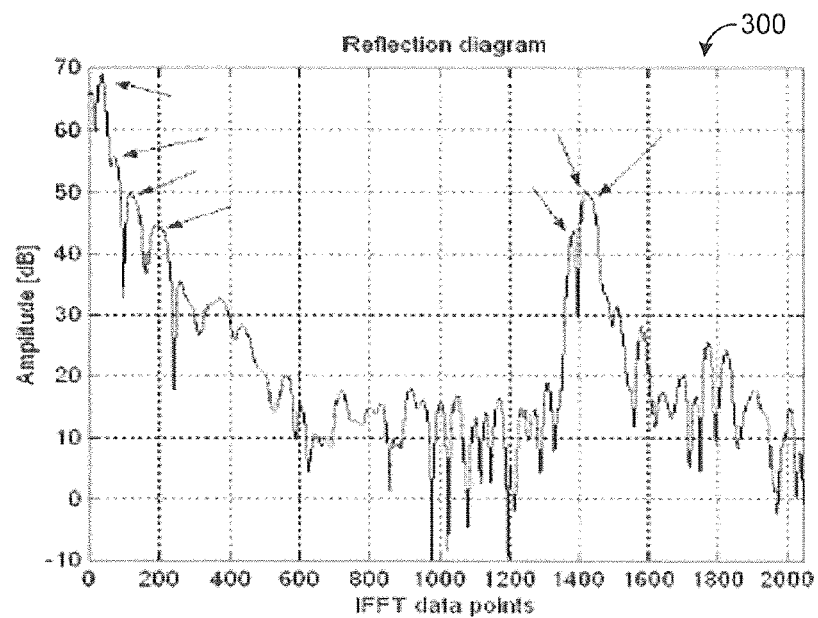
FIG. 3 illustrates an example range profile showing peaks present in wireless signals used by a level gauging system according to this disclosure.

FIG. 3 illustrates an example range profile 300 showing peaks present in wireless signals used by a level gauging system according to this disclosure. The reliable detection and identification of a target's reflection is often needed for accurate level measurements of material 104 in a tank 102. The range profile 300 shown in FIG. 3 illustrates a radar range profile or a reflection power spectral density, which identifies the amplitude of received electromagnetic signals over time.

In this example range profile 300, reflections identified by a level gauging system can be displayed as a series of "pulsed peaks." The reflection peak associated with the surface of the material 104 in the tank 102 may be present or absent in the range profile 300.

It can be seen in FIG. 3 that a specific target's reflection can appear with other reflections, such as reflections from a tank bottom or from a heating coil or other obstruction. In these kinds of situations, a peak selection algorithm faces the challenge of identifying the target's reflection peak correctly. Note that the target's reflection peak may or may not be the strongest or highest reflection peak or the first reflection peak. The algorithm disclosed in this patent document implements a robust technique for determining a target's peak position, even under varying conditions such as:

the material level is near the bottom of the tank 102;
the material level is near the antenna 108 or the tank roof;
the material level is approaching an obstruction;
different types of material 104 are present;
the system's power supply cycles off and on;
in- or off-loading of the tank 102 is occurring;
a stillpipe 110 with irregular slots is used; and
an antenna 108 is installed close to a tank's wall.

The HDM algorithm used to detect, identify, and track reflection peaks is described in more detail below.

Although FIG. 3 illustrates an example range profile 300 showing peaks present in wireless signals used by a level gauging system, various changes may be made to FIG. 3. For example, the wireless signals represented in FIG. 3 represent a specific example of the types of reflections that may be received and are for illustration only.

Figure 4:
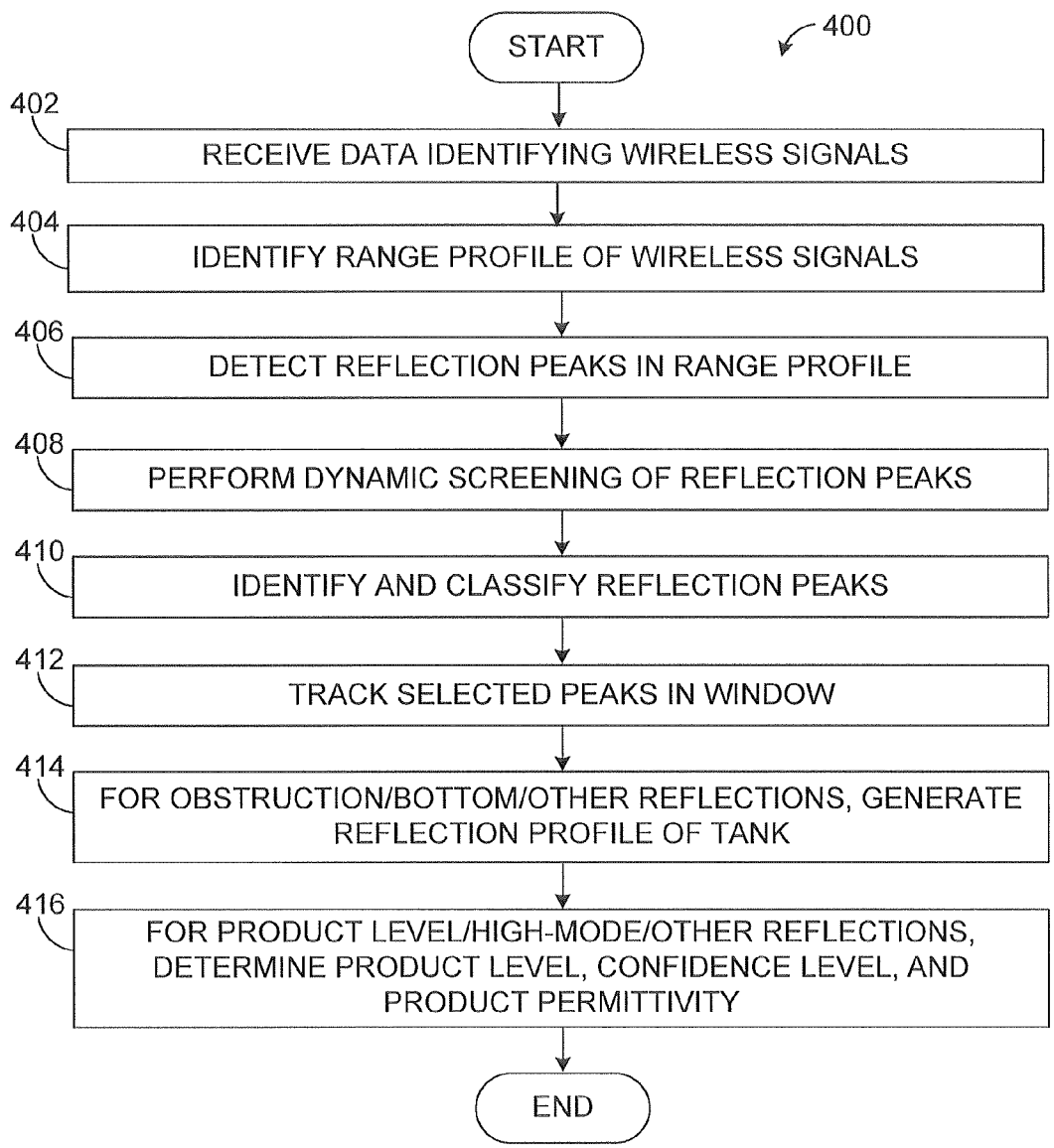
FIGS. 4 through 8B illustrate an example method for level gauging and related details according to this disclosure.

FIGS. 4 through 8B illustrate an example method 400 for level gauging and related details according to this disclosure. In particular, FIG. 4 illustrates a Hierarchical Decision Making (HDM) algorithm that can be used for level gauging, and FIGS. 5 through 8B illustrate details of steps in that algorithm. As noted above, the HDM algorithm can create open structures to handle a wide variety of scenarios encountered during level gauging. Through the open structures, new scenarios can be added, and reflections can be automatically classified, identified, and tracked under all of the categorized scenarios.

As shown in FIG. 4, data identifying wireless signals is received at step 402. This could include, for example, the receiver 210 in the level gauging system 200 down-converting received wireless signals into lower frequency signals. This may also include the data acquisition unit 212 digitizing the lower frequency signals.

Figure 5:
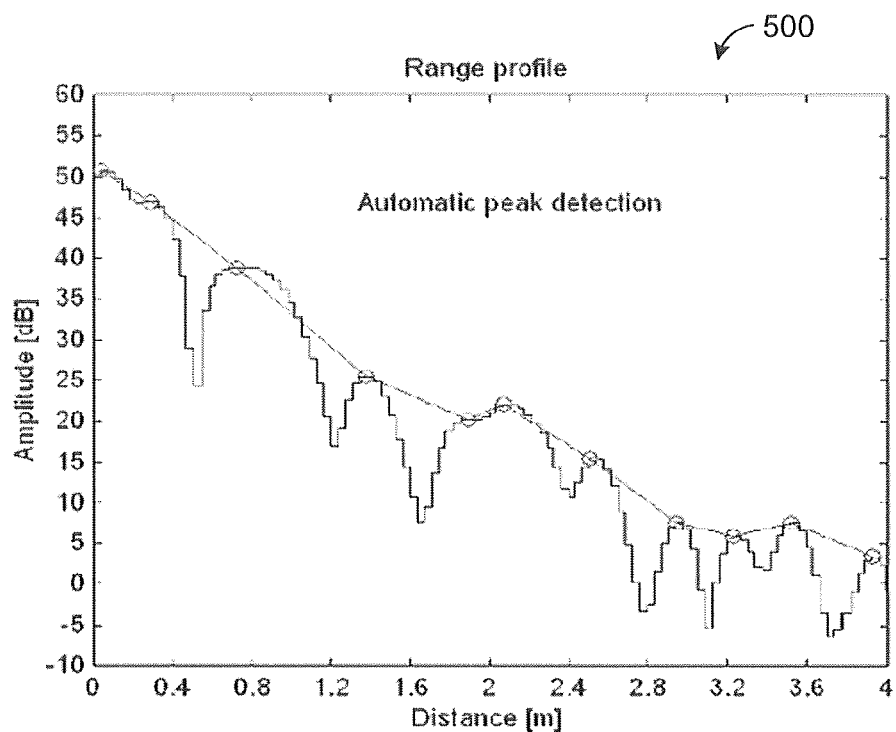

A range profile of the received wireless signals is generated at step 404, and reflection peaks are identified in the range profile at step 406. The range profile can plot a magnitude of the received wireless signals along a time/range axis. FIG. 5 shows an example range profile 500 with peaks that have been automatically detected by the HDM algorithm. The range profile 500 could be obtained in any suitable manner, such as by using fast Fourier transform (FFT) or inverse FFT (IFFT) processing of the data acquired by the receiver 210 in the level gauging system 200. The peaks could also be detected in any suitable manner, such as by identifying local maxima for a given time/range.

Figure 6:
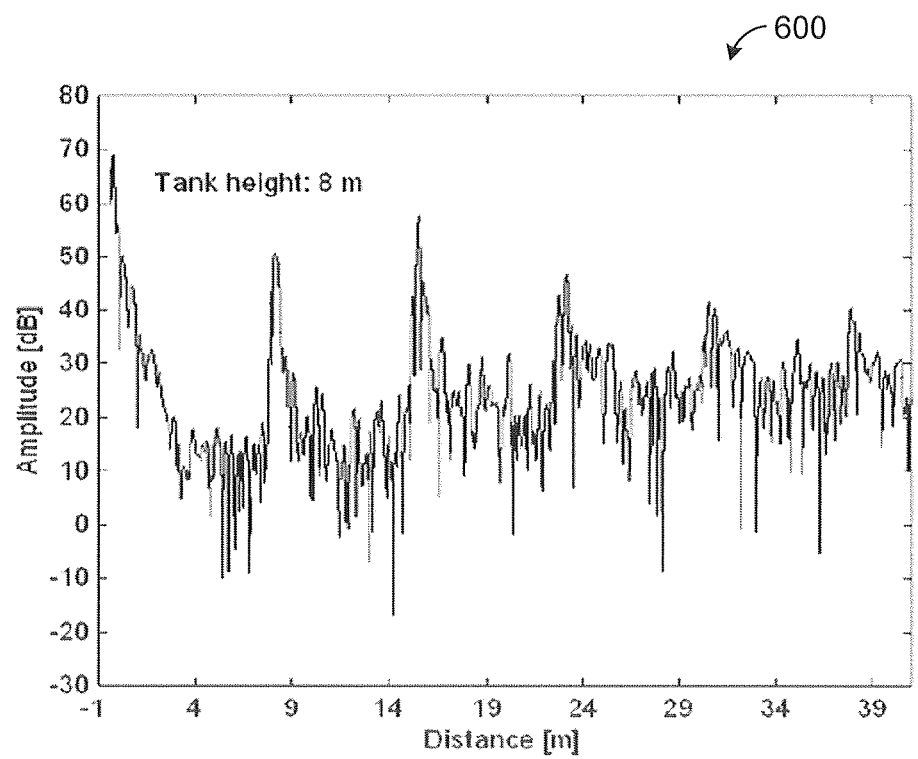
Figure 7:
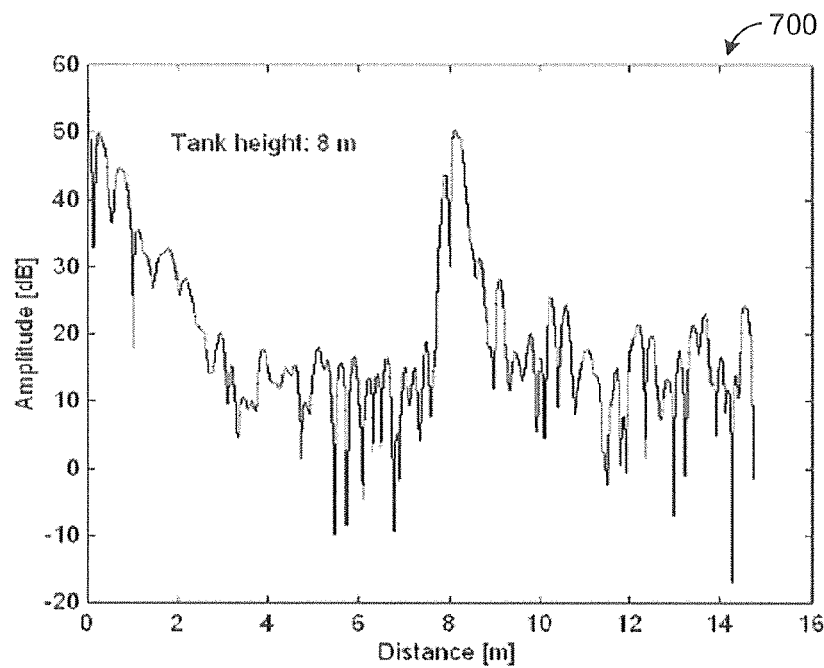

Dynamic screening of the detected reflection peaks is performed at step 408. For example, filtering can be used to reduce the number of detected peaks in a range profile to be analyzed, such as by filtering the peaks that are less relevant. As a particular example, the material 104 in an eight-meter tall tank 102 can hardly have any reflection beyond 15 meters, even though the level gauging system 200 could normally detect a target at 40 meters (due to multiple reflections of the wireless signals). In this example, a range profile 600 with a 40-meter window is shown in FIG. 6 for an eight-meter tall tank, and a segment 700 of the first 15 meters is shown in FIG. 7 (which is more succinct and still contains all the information needed for peak selection). All peaks beyond 15 meters can be filtered or discarded in this example.

The dynamic screening allows the algorithm to adaptively lock out those reflections that are not relevant to the level gauging system 200. In some embodiments, the dynamic screening procedure can occur as follows:

Sort the amplitudes of the peaks;
Find maxima of the signal's dynamic range;
Screen peaks with amplitudes below the dynamic minimum discardable signal (MDS) level; and
Screen peaks with distances beyond [0,$\Gamma$].

Here, $\Gamma$ is a product of the tank height and a root-squared dielectric constant of transparent material. The outcome of the peak screening can be dynamic and dependent on each set of measurement data. This is because the amplitude of reflections can fluctuate drastically, and the minimum discardable signal (MDS) level can automatically adjust itself accordingly.

Figure 8A:
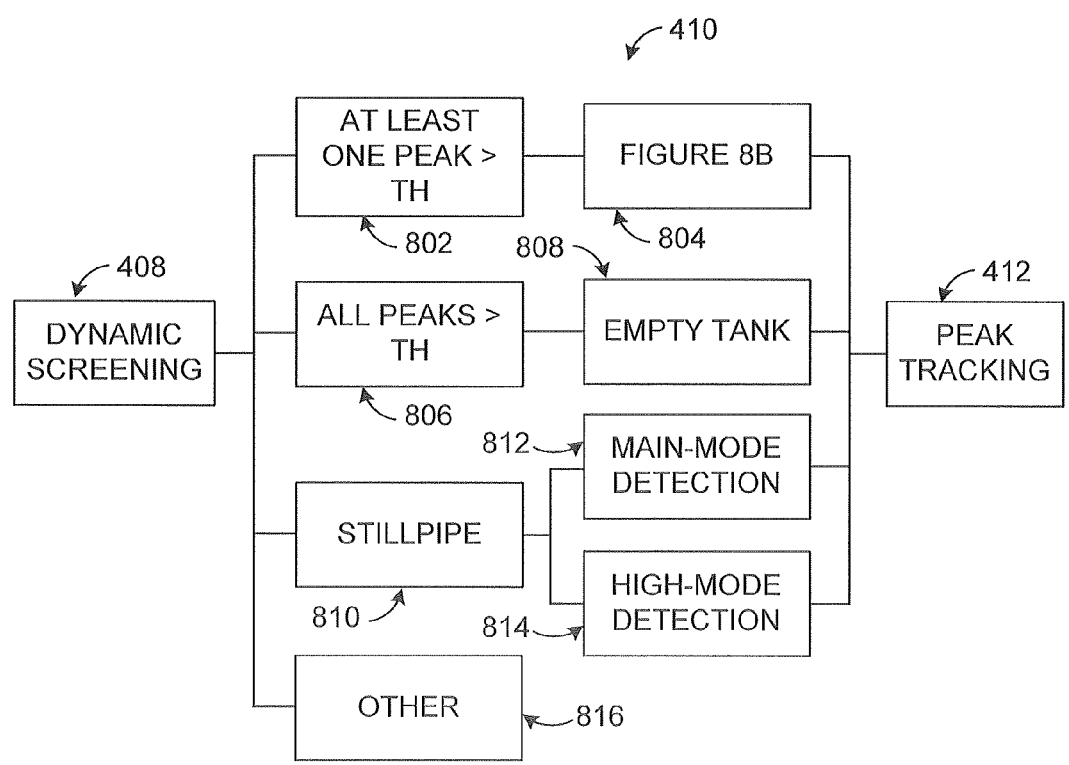
Figure 8B:
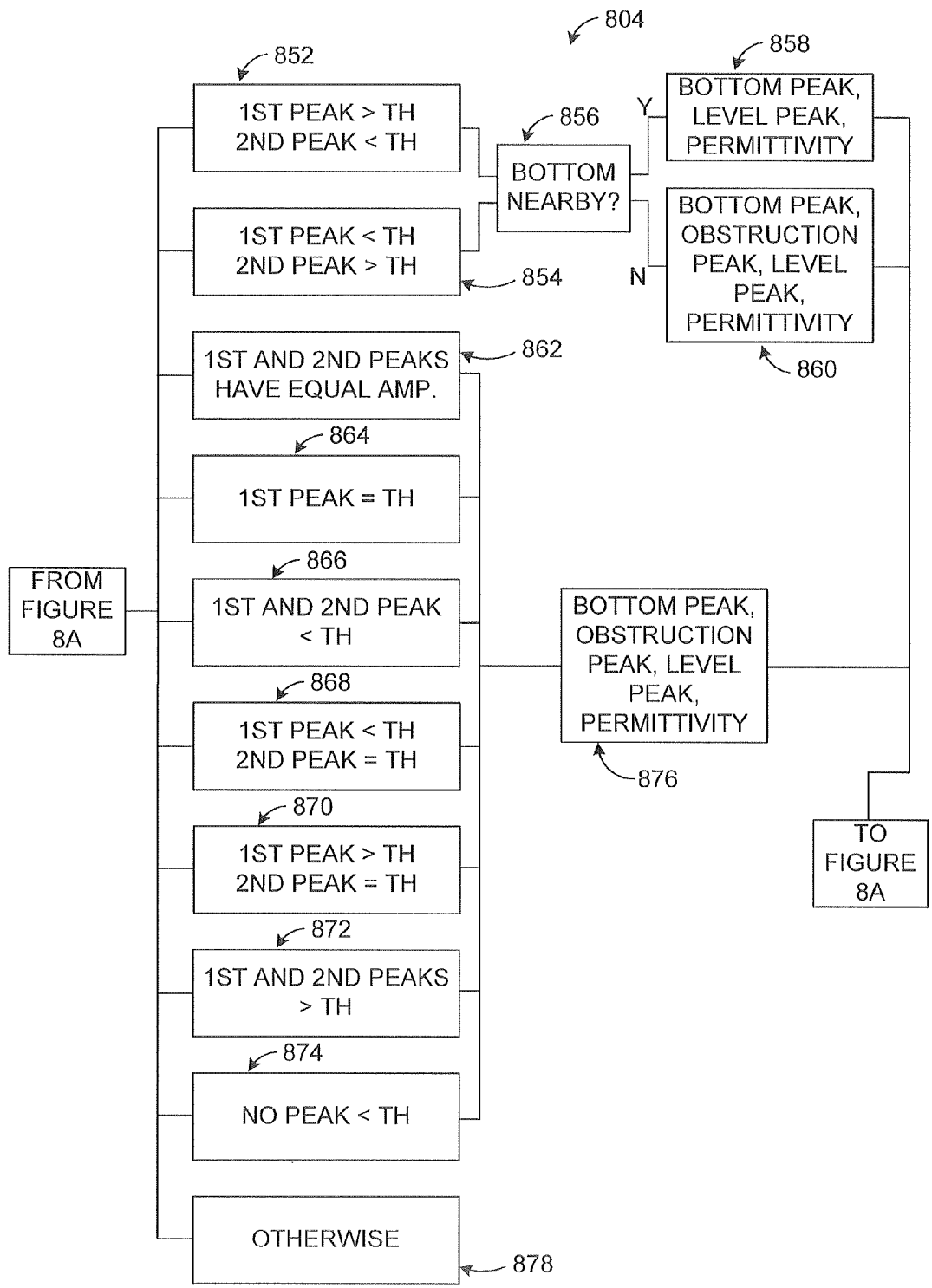

Reflection peaks are identified and classified at step 410. Because of the dynamic screening, the number of peaks may change from measurement to measurement. In some embodiments, peak identification is based on a hierarchical two-dimensional ruling comparison with a physical mechanism. An example structural overview of this approach is shown in FIGS. 8A and 8B, which are described below. Note that this step can result in the generation of various types of data for various types of reflections, such as data identifying high-mode reflections in stillpipes, obstruction reflections, and tank bottom reflections. This step can also involve determining whether the reflection from the surface of the material 104 in the tank 102 can be pre-identified.

Selected peaks are tracked within a two-dimensional window at step 412. For example, the pre-identified level peaks, bottom peaks, and obstruction peaks (if they are detected) can be tracked within the two-dimensional window. The tracking process can support two principles: physics-based tracking and mathematics-based tracking. The physics-based tracking can adopt the electromagnetic wave propagation principle. For instance, with the calculated permittivity of the material 104 from previously-tracked data by the level gauge 106b, the bottom reflection can be used to deduce the target peak position (which vanished due to interference) with the known physical height of the tank 102. The mathematics-based tracking can use two-dimensional parametric windowing to trace the amplitude and the position of the peaks. The tracking process could be carried out according to a peak list (if it is available from previous results) or according to logic facts and physics mechanisms. An index of the finally-identified target peak can be passed to a later step for use in determining the precise position of the reflected peak, which represents the distance between the antenna 108 and the surface of the material 104. Also, the tracking of an identified peak results in a confidence level assigned as an attribute to each peak. This may be especially useful when a target's reflection is destructively interfered with or vanishes. Since other peaks (such as high-mode and bottom reflections) can be used to deduce the position of the target's peak, the confidence level becomes more important in this situation.

For peaks classified as obstruction peaks, bottom peaks, or other types of peaks, these peaks can be used to construct a profile of the tank at step 414. With ample data collection and case coverage, reflections caused by internal construction of the tank 102 can be profiled. This profile is useful for peak tracking and interference handling. The profile can be dependent on the frequencies and antenna characteristics.

For peaks classified as product level peaks, high-mode reflection peaks, or other types of peaks (such as bottom peaks), these peaks can be used to determine the material level, a confidence level for the determined material level, and a permittivity of the material at step 416. For example, an electrical profile of the material 104 can include product permittivity and electrical ullage level relative to the antenna's phase centre. This profile may be important to indicate the physical innage level and in identifying the material 104. It may also be important information for peak tracking. The permittivity can be determined in any suitable manner. For instance, the permittivity can be calculated or obtained from previous tracking of permittivity when the wireless signals penetrate the material 104 and are reflected off both the surface of the material 104 and the bottom of the tank 102. The permittivity can be tracked at each measurement and can be used to deduce the location of the target reflection at times when the target reflection is lost. For example, when the reflection from the surface of the material 104 vanishes, the reflection position from the surface of the material 104 can be deduced using the bottom reflection, the tank height, and the permittivity from previous tracking.

As noted above, FIGS. 8A and 8B illustrate an example technique for identifying and classifying reflection peaks during step 410 of the HDM algorithm. In FIGS. 8A and 8B, detected reflection peaks are classified according to the rule of bottom detection. The peaks are then further analyzed and classified into different categories. In these figures, "TH" denotes the equivalent electrical position, which can for example be the tank height, expressed as a peak index number.

As shown in FIG. 8A, if at least one reflection peak is positioned after a specified electrical position (TH) at step 802, step 804 as shown in FIG. 8B can be performed. If all reflection peaks are positioned after the specified electrical position at step 806, a determination is made that the material level is at or near the bottom of the tank 102 (meaning the tank is empty) at step 808.

If a determination is made that a stillpipe is being used at step 810, main-mode detection occurs at step 812, and high-mode detection occurs at step 814. In this case, unwanted reflections from obstacles are unlikely since the wireless signals are sent through a stillpipe. However, high-mode fields, slots on stillpipes, and roughness of welded conjunctions are some sources that could affect an excited main-mode electromagnetic field. Also, during the loading-in process when the level of material 104 approaches an antenna aperture, the level peak can suffer more severe interferences and might actually disappear. In these situations, the algorithm can automatically use a strong high-mode reflection to infer the position of the main-mode original reflection from the material 104 in the tank 102.

Other peak classifications can occur at step 816 depending on the type of level gauging system being used.

As shown in FIG. 8B, steps 852-854 compare the positions of two peaks to a specific position (denoted TH). If either set of conditions is satisfied, a determination is made whether the material level is near a bottom of the tank 102 at step 856. If so, various bottom and material level peaks and the material permittivity can be estimated at step 858. If not, various bottom and material level and obstruction peaks and the material permittivity can be estimated at step 860.

Step 862 compares the two peaks' amplitudes, whiles step 864-872 further compare the two peak's positions. Step 874 compares all peaks' positions to the specified position. The results of these comparisons can be used to estimate various bottom and material level and obstruction peaks and the material permittivity at step 876. An additional step 878 can be performed to determine if other conditions are met.

In this way, the HDM algorithm can handle various types of reflections. The following describes specific types of reflections and how those reflections are handled by the HDM algorithm.

Bottom Reflection

For free-space applications, the process of loading in or loading off is often a very adverse situation. In particular, it may be more difficult to perform peak selection during pumping in compared to loading off. In an empty tank 102 where the material 104 splashes drastically, the reflection/scattering from the tank bottom and the material 104 can interact with each other. Consequently, the material peak can vanish for a while and/or the peak index and magnitude can fluctuate drastically. The algorithm can utilize multi-parameter information to keep track of the movement of the level peak. Here, the multi-parameter information can include bottom peak, material permittivity, and recent bottom and level peak information (if they are available). A similar treatment in stillpipe situations can be applied.

Obstruction Reflections in Free Space

In the HDM algorithm, a physical obstruction inside a tank 102 can be handled according to practical scenarios and antenna beam-widths. For example, a heating coil inside a tank 102 is usually located just above the tank bottom as common practice. For example, in marine vessels, the top surface of the heating coil is often installed around 20 cm-30 cm above the tank bottom (as estimated from level measurement data). The heating coil is obviously an obstacle to level measurements that are close to the tank bottom. With a wide-beam antenna 108, agitators and ladders can become obstructions, although they might (with the help of sharp pencil beam antennas) be avoided or electrically reduced. The obstructions' scattering amplitudes can be higher or lower than that of the level peak, and their peak positions could appear ahead of the level peak or behind the level peak. In the HDM algorithm, recording and tracking of an obstruction position are done in accordance with the changing of level position and product characteristics (if available).

Antenna Reflection

Antenna reflections include feeding-point mismatching reflection and aperture reflection. In the HDM algorithm, the first round of these reflections can be suppressed by windowing. The second or subsequent round(s) of these reflections may adhere to other reflections, but their magnitude could be significantly low if reasonable antenna characteristics are obtained. For a planar antenna structure, multiple reflections between a high-contrast material in the tank and the antenna surface may exist. The algorithm can include a detection scheme for multiple reflections.

Multiple Reflections Near Tank Roof

In some applications, multiple reflections may exist when the material level approaches the "dome" roof of a tank 102. The reflections can bounce up and down, forming the multiple reflections (especially if the inner tank roof has a paraboloid-like shape). As mentioned above, the HDM algorithm can implement a detection scheme that specifically deals with multiple reflections. The scheme could be based on both amplitude and position of the peaks. It can include pattern detection and peak identification. The first peak of a series of periodic peaks can simply be pre-identified as the level peak, even if it is not the highest peak.

Level Reflection

One simple situation in peak selection is that only one peak appears with highest amplitude in the middle of the tank. No interference and no ambiguity may exist here.

No Liquid Reflection

In stillpipe applications, the reflection of the excited main electromagnetic mode (such as TE01 or TE11) could vanish. One solution is to use high-mode reflections (such as TE02, TE05, TE07, or TE21) to get the peak position tracked. It may be verified by recent level peak information (if available). In free-space applications, multi-parameter information can be used to track the peak position, such as bottom peak, product permittivity, and recent bottom and level peak information (if available).

Note that the various scenarios of propagation and scattering may be determined and categorized in accordance with the peak selection schemes. The peak selection could be initially focused on the most common scenario, such as loading in/off in a nearly empty tank where bottom detection can be crucial for tracking the material level properly if interferences take place (as often happens during this scenario). For an unforeseen or other new scenario, the open structure offers the opportunity to incorporate the new scenario, whenever and wherever necessary. Also, the addition of new scenarios may not influence the existing scenarios.

As shown here, the HDM algorithm implemented in the method 400 can identify a target peak under various interferences, such as high-mode interferences in stillpipes, bottom reflections, obstruction reflections, power on/off, loading in/off, antenna/internal EMC reflections, different types of material, and small tank dimension (short distance between bottom and roof). Note that the peak detection, identification, and tracking algorithm can be implemented using any hardware, software, firmware, or combination thereof. Also note that the peak detection, identification, and tracking technique can be implemented in real-time. Further note that this technique can be used in a stand-alone device/system or integrated into another device/system. In some embodiments, this technique can be used with distance calculation algorithms or devices for determining a distance between a specified point and material in a tank. One example distance calculation algorithm or device is disclosed in U.S. patent application Ser. No. 12/279,976 and International Patent Application No. PCT/NL07/00048, both of which are hereby incorporated by reference. With this combination, reliable and high-precision level measurements can be taken. In addition, this technique can be applicable to various environments in addition to tank environments, such as stillpipe and free-space environments.

Although FIGS. 4 through 8B illustrate an example method for level gauging and related details, various changes may be made to FIGS. 4 through 8B. For example, while shown as a series of steps, various steps in FIG. 4 may overlap, occur in parallel, or occur multiple times. Also, the range profiles shown in FIGS. 5 through 7 are for illustration only. In addition, the peak identification and classification scheme shown in FIGS. 8A and 8B could be modified to identify and classify any suitable types of peaks.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "algorithm" and "program" refers to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying a level of material in a tank using at least one processing device, wherein identifying the level of the material in the tank comprises:
   receiving data identifying wireless signals including wireless signals reflected off a surface of the material in the tank;
   detecting a plurality of reflection peaks associated with the wireless signals;
   classifying at least one of the detected reflection peaks including a bottom peak associated with a bottom of the tank;
   tracking at least one of the classified reflection peaks; and
   identifying the level of the material in the tank using a known permittivity based on a previously-tracked level reflection peak, the bottom peak, and a known height of the tank to estimate a location of a level peak associated with the material when the level peak is lost or obscured by interference.

2. The method of claim 1, further comprising:
   performing dynamic screening of the detected reflection peaks to reduce a number of reflection peaks that are classified during the classification.

3. The method of claim 2, wherein performing the dynamic screening comprises:
   filtering all peaks associated with a distance greater than a specified maximum distance.

4. A method comprising:
   identifying a level of material in a tank using at least one processing device, wherein identifying the level of the material in the tank comprises:
   receiving data identifying wireless signals including wireless signals reflected off a surface of the material in the tank;
   detecting a plurality of reflection peaks associated with the wireless signals;
   classifying at least one of the detected reflection peaks;
   tracking at least one of the classified reflection peaks; and
   identifying the level of the material in the tank using at least one of the tracked reflection peaks;
   wherein classifying at least one of the detected reflection peaks comprises detecting at least one of: (i) a main-mode reflection peak associated with the wireless signals reflected off the surface of the material and (ii) a high-mode reflection peak associated with wireless transmission through a stillpipe in the tank;
   wherein, if the main-mode reflection peak is classified, the level of the material in the tank is identified using the main-mode reflection peak; and
   wherein, if the main-mode reflection peak is not classified, the high-mode reflection peak is used to estimate a location of the main-mode reflection peak, the level of the material in the tank is identified using the estimated location of the main-mode reflection peak, and a confidence level is associated with the identified level.

5. The method of claim 1, wherein classifying at least one of the detected reflection peaks comprises:
   comparing positions of at least two of the reflection peaks to a specified position; and
   comparing amplitudes of at least two of the reflection peaks.

6. The method of claim 5, wherein the at least two reflection peaks are initially selected to perform bottom detection in the tank.

7. The method of claim 1, further comprising:
   constructing a profile of obstructions in the tank using at least one of the classified reflection peaks; and
   identifying one of the tracked reflection peaks as the reflection peak associated with the wireless signals reflected off the surface of the material using the profile.

8. The method of claim 1, wherein detecting the plurality of reflection peaks associated with the wireless signals comprises detecting all reflection peaks associated with the wireless signals.

9. The method of claim 1, wherein:
   classifying at least one of the detected reflection peaks comprises classifying the level peak associated with the material in the tank, the bottom peak associated with the bottom of the tank, and an obstruction peak associated with an obstruction in the tank; and
   tracking at least one of the classified reflection peaks comprises tracking the level peak, the bottom peak, and the obstruction peak and associating a confidence level with each peak.

10. An apparatus comprising:
    a data acquisition unit configured to generate data associated with received wireless signals including wireless signals reflected off a surface of material in a tank; and
    at least one processing device configured to:
    detect a plurality of reflection peaks associated with the wireless signals;
    classify at least one of the detected reflection peaks;
    track at least one of the classified reflection peaks; and
    identify a level of the material in the tank using at least one of the tracked reflection peaks;
    wherein the at least one processing device is configured to classify at least one of the detected reflection peaks by detecting at least one of: (i) a main-mode reflection peak associated with the wireless signals reflected off the surface of the material and (ii) a high-mode reflection peak associated with wireless transmission through a stillpipe in the tank;
    wherein the at least one processing device is configured to identify the level of the material in the tank using the main-mode reflection peak if the main-mode reflection peak is classified; and
    wherein the at least one processing device is configured to estimate a location of the main-mode reflection peak using the high-mode reflection peak, identify the level of the material in the tank using the estimated location of the main-mode reflection peak, and associate a confidence level with the identified level if the main-mode reflection peak is not classified.

11. The apparatus of claim 10, wherein the at least one processing device is further configured to perform dynamic screening of the detected reflection peaks to reduce a number of reflection peaks that are classified during the classification.

12. The apparatus of claim 10, wherein:
the at least one processing device is configured to classify a level peak associated with the material in the tank, a bottom peak associated with a bottom of the tank, and an obstruction peak associated with an obstruction in the tank;
the at least one processing device is configured to track the level peak, the bottom peak, and the obstruction peak and to associate a confidence level with each peak; and
the at least one processing device is configured to identify the level of the material in the tank using a known permittivity based on a previously-tracked level reflection peak, the bottom peak, and a known height of the tank to estimate a location of the level peak when the level peak is lost or obscured by interference.

13. The apparatus of claim 10, wherein the at least one processing device is configured to classify at least one of the detected reflection peaks by:
comparing positions of at least two of the reflection peaks to a specified position; and
comparing amplitudes of at least two of the reflection peaks.

14. The apparatus of claim 10, wherein the at least one processing device is further configured to:
construct a profile of obstructions in the tank using at least one of the classified reflection peaks; and
identify one of the tracked reflection peaks as the reflection peak associated with the wireless signals reflected off the surface of the material using the profile.

15. An apparatus comprising:
a data acquisition unit configured to generate data associated with received wireless signals including wireless signals reflected off a surface of material in a tank; and
at least one processing device configured to:
detect a plurality of reflection peaks associated with the wireless signals;
classify at least some of the detected reflection peaks;
track at least some of the classified reflection peaks; and
identify a level of the material in the tank using at least some of the tracked reflection peaks;
wherein the at least one processing device is configured to classify a level peak associated with the material in the tank, a bottom peak associated with a bottom of the tank, and an obstruction peak associated with an obstruction in the tank;
wherein the at least one processing device is configured to track at least the level peak, the bottom peak, and the obstruction peak and to associate a confidence level with each peak; and
wherein the at least one processing device is configured to identify the level of the material in the tank using a known permittivity based on a previously-tracked level reflection peak, the bottom peak, and a known height of the tank to estimate a location of the level peak when the level peak is lost or obscured by interference.

16. The apparatus of claim 10, wherein the at least one processing device comprises a digital signal processor.

17. The apparatus of claim 10, further comprising:
a controller configured to control operation of the apparatus.

18. A non-transitory computer readable medium embodying a computer program executable by at least one processing device, the computer program comprising:
computer readable program code for receiving data identifying wireless signals including wireless signals reflected off a surface of material in a tank;
computer readable program code for detecting a plurality of reflection peaks associated with the wireless signals;
computer readable program code for classifying at least one of the detected reflection peaks including a bottom peak associated with a bottom of the tank;
computer readable program code for tracking at least one of the classified reflection peaks; and
computer readable program code for identifying a level of the material in the tank using a known permittivity based on a previously-tracked level reflection peak, the bottom peak, and a known height of the tank to estimate a location of a level peak associated with the material when the level peak is lost or obscured by interference.

19. A non-transitory computer readable medium embodying a computer program executable by at least one processing device, the computer program comprising:
computer readable program code for receiving data identifying wireless signals including wireless signals reflected off a surface of material in a tank;
computer readable program code for detecting a plurality of reflection peaks associated with the wireless signals;
computer readable program code for classifying at least one of the detected reflection peaks;
computer readable program code for tracking at least one of the classified reflection peaks; and
computer readable program code for identifying a level of the material in the tank using at least one of the tracked reflection peaks;
wherein the computer readable program code for classifying at least one of the detected reflection peaks comprises computer readable program code for detecting at least one of: (i) a main-mode reflection peak associated with the wireless signals reflected off the surface of the material and (ii) a high-mode reflection peak associated with wireless transmission through a stillpipe in the tank; and
wherein the computer readable program code for identifying the level of the material comprises:
computer readable program code for identifying the level of the material in the tank using the main-mode reflection peak if the main-mode reflection peak is classified; and
computer readable program code for using the high-mode reflection peak to estimate a location of the main-mode reflection peak, computer readable program code for using the estimated location of the main-mode reflection peak to identify the level of the material, and computer readable program code for associating a confidence level with the identified level if the main-mode reflection peak is not classified.

20. The non-transitory computer readable medium of claim 18, wherein the computer readable program code for classifying at least one of the detected reflection peaks comprises:
computer readable program code for comparing positions of at least two of the reflection peaks to a specified position; and
computer readable program code for comparing amplitudes of at least two of the reflection peaks.

* * * * *